Figure 1:
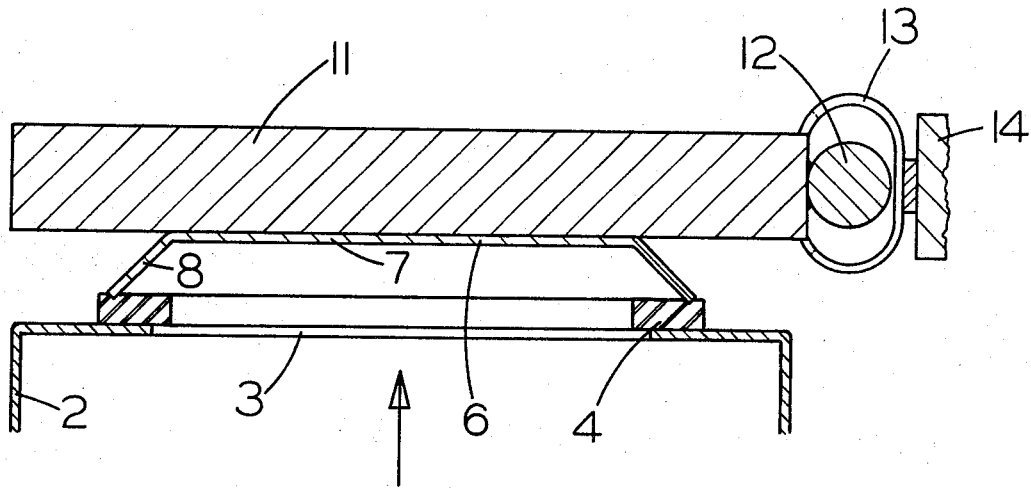

United States Patent
Rivers et al.

[15] 3,677,289
[45] July 18, 1972

[54] PRESSURE RELIEF VALVE

[72] Inventors: Richard D. Rivers; Thomas W. Byers; Edward J. Fortener, all of Louisville, Ky.

[73] Assignee: American Air Filter Company, Inc., Louisville, Ky.

[22] Filed: Sept. 9, 1970

[21] Appl. No.: 70,704

[52] U.S. Cl. .......................... 137/527.8, 137/527.4, 251/333
[51] Int. Cl. ..................................................... F16k 15/03
[58] Field of Search ................ 137/526, 512.1, 527.4, 527.6, 137/527.8, 527; 251/333, 298

[56] References Cited

UNITED STATES PATENTS

| | | |
|---|---|---|
| 2,267,797 | 12/1941 | Martin ................................ 137/527.8 |
| 201,758 | 3/1878 | Downey ............................. 137/527.8 |
| 2,838,062 | 6/1958 | Held .................................. 137/527.6 |
| 3,072,141 | 1/1963 | Wheeler ............................ 137/512.1 |
| 350,219 | 10/1886 | Trott ................................. 137/527.8 |

Primary Examiner—Alan Cohan
Assistant Examiner—William H. Wright
Attorney—Ralph B. Brick and Charles G. Lamb

[57] ABSTRACT

A pressure relief valve assembly for a plenum chamber including a ported valve seat communicating with an outlet of the chamber and a weighted relief valve cooperating with the ported valve seat, the extreme edge of the valve engaging in sharp-line contact with the ported valve seat.

3 Claims, 2 Drawing Figures

INVENTOR.
RICHARD D. RIVERS
THOMAS W. BYERS
BY  EDWARD J. FORTENER

Ralph B. Brick

PRESSURE RELIEF VALVE

BACKGROUND OF THE INVENTION

Various types of relief valve assemblies for plenum chambers subject to undesirably high pressures are known in the art. Many of these past pressure relief valve assemblies have been expensive to construct, operate and maintain and often there has been frequent wear of the several parts of the assembly with inefficient and non-uniform sealing of the valve with the ported valve seat.

In accordance with the present invention, a straightforward, economical and efficient pressure relief valve assembly is provided, which avoids the difficulties of the past, and which, at the same time provides a required high sealing pressure with an optimum weight responding quickly to increased pressure in the plenum chamber with the sealing pressure being effected by concentrating the weight over a limited area of engagement between the valve seat and the valve member. In addition, the present invention utilizes stored energy through the resiliency of one of the two members of the assembly to overcome the inertia of the assembly when pressure relief is essential.

Various other features of the present invention will become obvious to one skilled in the art upon reading the disclosure set forth hereinafter.

More particularly, the present invention provides a pressure relief valve assembly for a plenum chamber comprising a ported valve seat communicating with an outlet of the chamber, and a fluid impervious weighted relief valve having a body portion in covering relation with the outlet of the chamber and a peripheral portion extending at an angle to the body portion with an extreme edge thereof engaging in sharp-line contact with the surface of the ported valve seat.

It is to be understood that various changes can be made in the arrangement, form and construction of the apparatus disclosed herein without departing from the scope or spirit of the present invention.

Figure 2:
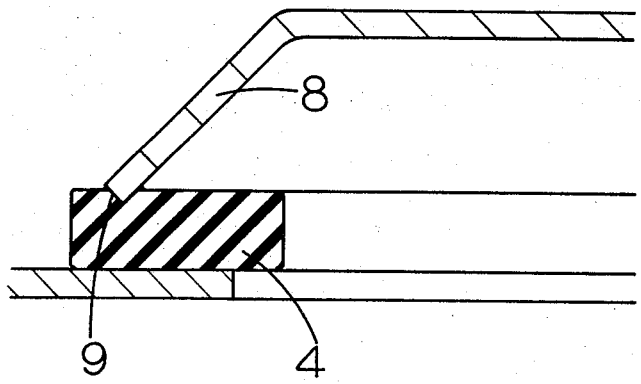

Referring to the drawing which discloses one advantageous embodiment of the present invention:

FIG. 1 is a cross-sectional side elevational view of a schematic arrangement of the novel pressure relief valve assembly; and FIG. 2 is an enlarged side elevational view of a portion of the apparatus of FIG. 1 showing in more detail the manner in which the extreme edge of the peripheral portion of the valve engages with the surface of the ported valve seat.

As can be seen in FIG. 1 of the drawing, plenum chamber 2 (only a portion of which is disclosed) is provided with outlet 3. Surrounding the peripheral edge of outlet 3, is ported valve seat 4. Valve seat 4 can be made of any one of several suitable materials and advantageously is made from a suitable resilient material such as a poly-vinyl rubber of heat resistant nature.

Adapted to engage with ported valve seat 4 is fluid impervious relief valve 6. Valve 6 includes flat body portion 7 and peripheral rim portion 8 extending at an angle to body portion 7. In the embodiment disclosed, the valve member is of pie shape configuration and can be stamped economically from a suitable metal sheet of fluid impervious material. It is also to be understood that, if desired, valve member 6 can be resilient in nature and valve seat 4 can be of metallic material.

Advantageously, peripheral rim portion 8 of valve 6 extends at a substantially 135° angle from body portion 7 and as can be seen more fully in FIG. 2 of the drawing the extreme edge surface 9 of peripheral rim portion 8 rests in a plane extending substantially at a 45° angle to the surface of ported valve seat 4 with which the extreme edge of the rim 8 engages in sharp-line contact. Accordingly, when this occurs, the resilient material of valve seat 4 is displaced around the extremity of rim portion 8 to prevent the rim from cutting the valve seat.

To provide uniform pressure along body portion 7 of valve 6, a separate flat weight 11 is arranged to extend over the top surface of body portion 7. Weight 11 is provided with a longitudinally extending pintle 12 at one side thereof which pintle nests loosely in a keeper 13 fixedly anchored to support structure 14 which can constitute part of plenum chamber 2. Keeper 13 is of eliptical cross-section and can be provided with a suitable cut-away to receive pintle 12 to permit pivotable movement of weight 11 about the pintle as well as limited vertical movement of the pintle within the keeper to further assure that the weight 11 is distributed uniformly above body portion 7.

In accordance with the present invention when sufficient pressure occurs within chamber 2, the sharp-line sealing pressure between valve 6 and ported valve seat 4 is readily overcome with the inertia created through the resiliency of ported valve seat 4 supplementing the desired relief action.

The invention claimed is:

1. A pressure relief valve assembly for a plenum chamber comprising a ported resilient valve seat communicating with an outlet of said chamber; a fluid impervious body portion in covering relation with said outlet of said chamber, said body portion having a peripheral portion extending at an angle of about 135° to said body with an extreme 90° edge thereof resting in a plane extending substantially at a 45° angle to the surface of said ported resilient valve seat and engaging in sharp-line contact therewith; a weight positioned on top of and overhanging said body portion to provide a sealing pressure transmitted to said resilient valve seat through said peripheral portion to resiliently deflect, without cutting, said valve seat, thereby providing that when sufficient pressure occurs within said plenum chamber said sealing pressure is readily overcome with the aid of an upward force due to the resiliency of said ported resilient valve seat.

2. The apparatus of claim 1, said body portion and said peripheral portion being an integrally stamped unit.

3. The apparatus of claim 1, said weight including a pintle mounted on one end thereof for limited free movement in a fixed place sleeve to permit vertical and pivotal movement of said valve member.

* * * * *